(12) United States Patent
Fujii (10) Patent No.: US 9,107,108 B2
(45) Date of Patent: Aug. 11, 2015

(54) DISCRIMINATING A FUNCTION OF ANOTHER COMMUNICATION APPARATUS AND EXECUTING A COMMUNICATION PARAMETERS SETTING PROCEDURE

(75) Inventor: Kenichi Fujii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 253 days.

(21) Appl. No.: 12/442,225

(22) PCT Filed: Oct. 5, 2007

(86) PCT No.: PCT/JP2007/070013
§ 371 (c)(1),
(2), (4) Date: Mar. 20, 2009

(87) PCT Pub. No.: WO2008/050622
PCT Pub. Date: May 2, 2008

(65) Prior Publication Data
US 2010/0020706 A1    Jan. 28, 2010

(30) Foreign Application Priority Data
Oct. 27, 2006   (JP) .................................. 2006-292710

(51) Int. Cl.
| | | |
|---|---|---|
| *G06F 15/16* | (2006.01) | |
| *G06F 15/173* | (2006.01) | |
| *G06F 15/177* | (2006.01) | |
| *H04W 28/18* | (2009.01) | |
| *H04W 88/02* | (2009.01) | |

(52) U.S. Cl.
CPC .............. *H04W 28/18* (2013.01); *H04W 88/02* (2013.01)

(58) Field of Classification Search
CPC .............................. H04W 88/02; H04W 28/18
USPC .................................................. 709/217–229
See application file for complete search history.

(56) References Cited

U.S. PATENT DOCUMENTS

| | | | |
|---|---|---|---|
| 7,515,897 B2 | 4/2009 | Suzuki | 455/343.2 |
| 7,542,760 B2 | 6/2009 | Sugaya et al. | 455/420 |
| 7,720,477 B2 * | 5/2010 | Moritomo et al. | 455/435.1 |
| 7,899,439 B2 * | 3/2011 | Hibino | 455/410 |

(Continued)

FOREIGN PATENT DOCUMENTS

| | | |
|---|---|---|
| CN | 1630217 A | 6/2005 |
| CN | 1787458 A | 6/2006 |

(Continued)

*Primary Examiner* — Haresh N Patel
(74) *Attorney, Agent, or Firm* — Fitzpatrick, Cella, Harper & Scinto (57) ABSTRACT

When the role of a receiver is not predetermined, it is impossible to uniquely determine the transfer direction of communication parameters. A communication apparatus comprises: discrimination means adapted to discriminate a function of another communication apparatus with respect to communication parameter setting processing when the self communication apparatus is a candidate for a providing apparatus of communication parameters; setting means adapted to set the function of the self communication apparatus as a receiving apparatus of communication parameters upon detecting an apparatus that is confirmed as a providing apparatus of communication parameters before a set time elapses; and execution means adapted, if the setting means sets the function as the receiving apparatus, to execute, as a receiving apparatus of communication parameters, the communication parameter setting processing with the providing apparatus.

14 Claims, 7 Drawing Sheets

(56) References Cited

U.S. PATENT DOCUMENTS

| | | |
|---|---|---|
| 7,990,903 B2 | 8/2011 | Nishihara et al. .............. 370/312 |
| 8,180,290 B2 | 5/2012 | Cho .............................. 455/41.2 |
| 2002/0147819 A1 | 10/2002 | Miyakoshi et al. |
| 2005/0060419 A1 | 3/2005 | Fujii et al. ..................... 709/230 |
| 2005/0066197 A1 | 3/2005 | Hirata et al. ................... 713/201 |
| 2005/0143046 A1 | 6/2005 | Suzuki ......................... 455/343.2 |
| 2006/0045055 A1 | 3/2006 | Ramadas et al. .............. 370/338 |
| 2006/0111097 A1* | 5/2006 | Fujii ............................. 455/420 |
| 2006/0128360 A1* | 6/2006 | Hibino ......................... 455/411 |
| 2006/0200564 A1 | 9/2006 | Watanabe et al. ............. 709/227 |
| 2006/0206592 A1 | 9/2006 | Fujii et al. .................... 709/220 |
| 2006/0242025 A1* | 10/2006 | Nishihara et al. ............. 705/15 |
| 2006/0242304 A1 | 10/2006 | Hirose et al. ................. 709/227 |
| 2006/0246946 A1* | 11/2006 | Moritomo et al. ............ 455/557 |
| 2006/0246947 A1 | 11/2006 | Fujii et al. .................... 455/557 |
| 2006/0268744 A1 | 11/2006 | Sakai et al. ................... 370/254 |
| 2006/0282541 A1* | 12/2006 | Hiroki .......................... 709/228 |
| 2007/0002867 A1 | 1/2007 | Shitano et al. ................ 370/395.5 |
| 2008/0089300 A1 | 4/2008 | Yee |
| 2010/0182956 A1* | 7/2010 | Moritomo et al. ............ 370/328 |

FOREIGN PATENT DOCUMENTS

| | | |
|---|---|---|
| EP | 1545053 A2 | 6/2005 |
| JP | 2001-168881 A | 6/2001 |
| JP | 2002-164901 A | 6/2002 |
| JP | 2002-325273 A | 11/2002 |
| JP | 2002-359623 A | 12/2002 |
| JP | 2003-069580 A | 3/2003 |
| JP | 2003-078531 A | 3/2003 |
| JP | 2003-152614 A | 5/2003 |
| JP | 2003-338821 A | 11/2003 |
| JP | 2005-341290 A | 12/2005 |
| JP | 2006-246357 A | 9/2006 |
| WO | 2004/064328 A2 | 7/2004 |

\* cited by examiner

DISCRIMINATING A FUNCTION OF ANOTHER COMMUNICATION APPARATUS AND EXECUTING A COMMUNICATION PARAMETERS SETTING PROCEDURE

TECHNICAL FIELD

The present invention relates to a communication parameter setting method for setting communication parameters in a communication apparatus, a communication apparatus, a control method therefor, and a program.

BACKGROUND ART

In wireless communication represented by a wireless LAN complying with the IEEE802.11 standard series, there are many setting items to be set in advance. The setting items include wireless parameters necessary for wireless communication, such as an SSID as a network identifier, an encryption scheme, an encryption key, an authentication scheme, and an authentication key. It is very troublesome for a user to manually set them.

Various manufacturers have proposed automatic setting methods for easily setting wireless parameters in a wireless apparatus. In those automatic setting methods, one apparatus provides another apparatus with wireless parameters using a procedure predetermined between these connected apparatuses and a message, thereby automatically setting the wireless parameters.

As for the automatic wireless parameter setting method, each manufacturer often employs its own method. Procedures for setting wireless parameters or interpretable messages are different between apparatuses which do not support a common wireless parameter automatic setting method. In this case, it is impossible to set wireless parameters using the automatic setting method. On the other hand, between apparatuses which support a common wireless parameter automatic setting method, it is possible to easily set wireless parameters using the automatic setting method.

In Japanese Patent Laid-Open No. 2003-338821, an example of a wireless parameter automatic setting method is disclosed.

In a conventional wireless parameter setting method, the roles of a provider (transmitting side) and receiver (receiving side) of wireless parameters are predetermined. The transfer direction of the wireless parameters is, therefore, uniquely determined.

When the roles of a provider and receiver of wireless parameters are not predetermined, it is impossible to uniquely determine the transfer direction of the wireless parameters. In such a case, if a user is required to select an apparatus as a provider and an apparatus as a receiver of parameters, user friendliness is significantly decreased.

Furthermore, if a plurality of apparatuses are providers, an apparatus as a receiver cannot determine from which of those providers it should receive parameter information.

The above problems may arise not only for wireless parameters but also for wired communication parameters which need to be set for communication between apparatuses.

DISCLOSURE OF INVENTION

The present invention makes it possible to set communication parameters even if the roles of a provider and receiver of parameters are not predetermined.

According to one aspect of the present invention, a communication apparatus comprises:

discrimination means adapted to discriminate a function of another communication apparatus with respect to communication parameter setting processing when the self communication apparatus is a candidate for a providing apparatus of communication parameters;

setting means adapted to set the function of the self communication apparatus as a receiving apparatus of communication parameters upon detecting an apparatus that is confirmed as a providing apparatus of communication parameters before a set time elapses; and execution means adapted, if the setting means sets the function as the receiving apparatus, to execute, as a receiving apparatus of communication parameters, the communication parameter setting processing with the providing apparatus.

According to another aspect of the present invention, a method for executing communication parameter setting processing, comprises the steps of:

discriminating a function of another communication apparatus with respect to the communication parameter setting processing when a self communication apparatus is a candidate for a providing apparatus of communication parameters;

setting the function of the self communication apparatus as a receiving apparatus of communication parameters upon detecting an apparatus that is confirmed as a providing apparatus of communication parameters before a set time elapses; and executing, as a receiving apparatus of communication parameters, the communication parameter setting processing with the providing apparatus.

According to still another aspect of the present invention, a control method for a communication apparatus, comprises the steps of:

discriminating a function of another communication apparatus with respect to communication parameter setting processing when the self communication apparatus is a candidate for a providing apparatus of communication parameters;

setting the function of the self communication apparatus as a receiving apparatus of communication parameters when detecting an apparatus that is confirmed as a providing apparatus of communication parameters before a set time elapses; and executing, if the function is set as the receiving apparatus in the setting step, as a receiving apparatus of communication parameters, the communication parameter setting processing with the providing apparatus.

According to yet another aspect of the present invention, a program controls a communication apparatus by causing a computer to execute codes for steps of:

discriminating a function of another communication apparatus with respect to communication parameter setting processing when the self communication apparatus is a candidate for a providing apparatus of communication parameters;

setting the function of the self communication apparatus as a receiving apparatus of communication parameters upon detecting an apparatus that is confirmed as a providing apparatus of communication parameters before a set time elapses; and executing, if the function is set as the receiving apparatus in the code for the setting step, as a receiving apparatus of communication parameters, the communication parameter setting processing with the providing apparatus.

Further features of the present invention will become apparent from the following description of exemplary embodiments with reference to the attached drawings.

BEST MODE FOR CARRYING OUT THE INVENTION

Figure 1:
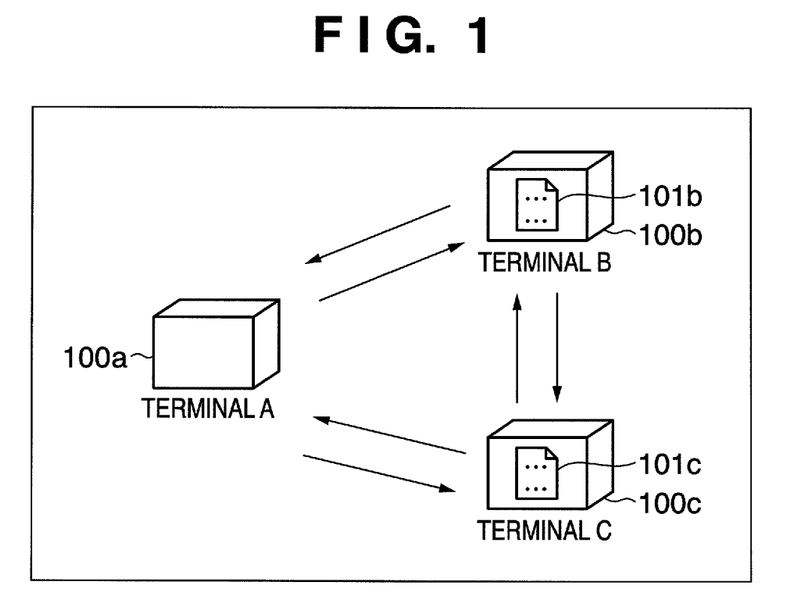
FIG. 1 is a view showing a configuration in which an ad hoc network is formed of a plurality of terminals in an embodiment.

FIG. 1 shows a network configuration example for explaining an embodiment.

In the configuration shown in FIG. 1, there exist a terminal A 100a, terminal B 100b, and terminal C 100c which have a wireless communication function of an IEEE802.11 wireless LAN. The terminal A 100a is referred to as a terminal A; the terminal B 100b, a terminal B; and the terminal C 100c, a terminal C hereinafter. The terminal A, terminal B, and terminal C have a wireless parameter automatic setting application. With the wireless parameter automatic setting application according to the embodiment, the first terminal provides the second terminal with wireless parameters for executing wireless communication. Assume that the wireless parameters are all or some pieces of information such as an SSID as a network identifier, an encryption scheme, an encryption key, an authentication scheme, and an authentication key. Note that SSID is an abbreviation for Service Set Identifier. The second terminal sets the received wireless parameters. The wireless parameters are provided using a predetermined procedure and a message by means of a packet which can be communicated regardless of the wireless parameters of the two communication terminals. Alternatively, the wireless parameters may be provided using a predetermined procedure and a message in the following manner. When providing wireless parameters, the two terminals go into a setting mode, and change their wireless parameters to predetermined ones for setting, thereby establishing communication between the terminals.

The terminal B in FIG. 1 stores, in a memory, wireless parameter setting information 101b as setting information of wireless parameters for wireless communication. The terminal C stores wireless parameter setting information 101c in a memory. The wireless parameter setting information contains wireless parameters for executing wireless communication, such as an SSID as a network identifier, an encryption scheme, an encryption key, an authentication scheme, and an authentication key. Each terminal performs wireless communication by ad hoc communication in an IEEE802.11 wireless LAN ad hoc mode.

Figure 2:
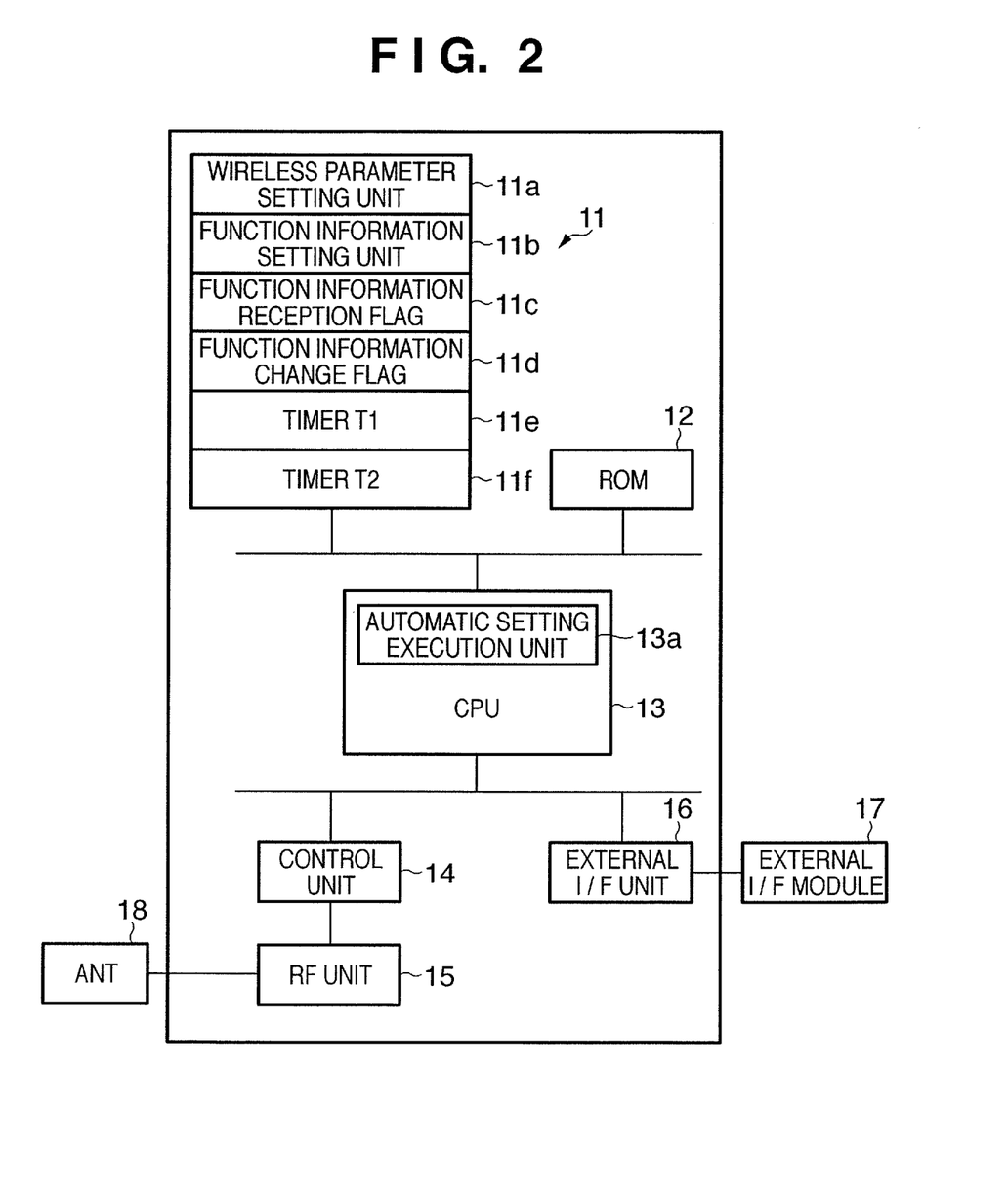
FIG. 2 is a block diagram showing a configuration example of a terminal in the embodiment.

FIG. 2 is a block diagram showing a configuration example for the terminal A, terminal B, and terminal C.

A ROM 12 stores programs for executing various processes (to be described later). A RAM 11 stores temporary variables, data, and cache data. The RAM 11 has a wireless parameter setting unit 11a for setting wireless parameters. Furthermore, the RAM 11 has a function information setting unit 11b, function information reception flag 11c, function information change flag 11d, timer T1 11e, and timer T2 11f (to be described later). A CPU 13 executes the programs stored in the ROM 12 to perform various processes (to be described later). The CPU 13 has an automatic setting execution unit 13a for executing a wireless parameter automatic setting application. A control unit 14 controls a wireless function. An RF unit 15 performs wireless LAN communication complying with the IEEE802.11 standard via an antenna unit 18. An external interface unit 16 is a wired interface for connecting the terminal with external apparatuses. An external interface module 17 is a module such as a connector for connecting external apparatuses. Information processing apparatuses as external apparatuses such as a personal computer, digital camera, printer, and scanner are connected via the external interface unit 16 and the external interface module 17. The hardware configuration shown in FIG. 2 is an example, and it is possible to use other configurations.

Figure 3:
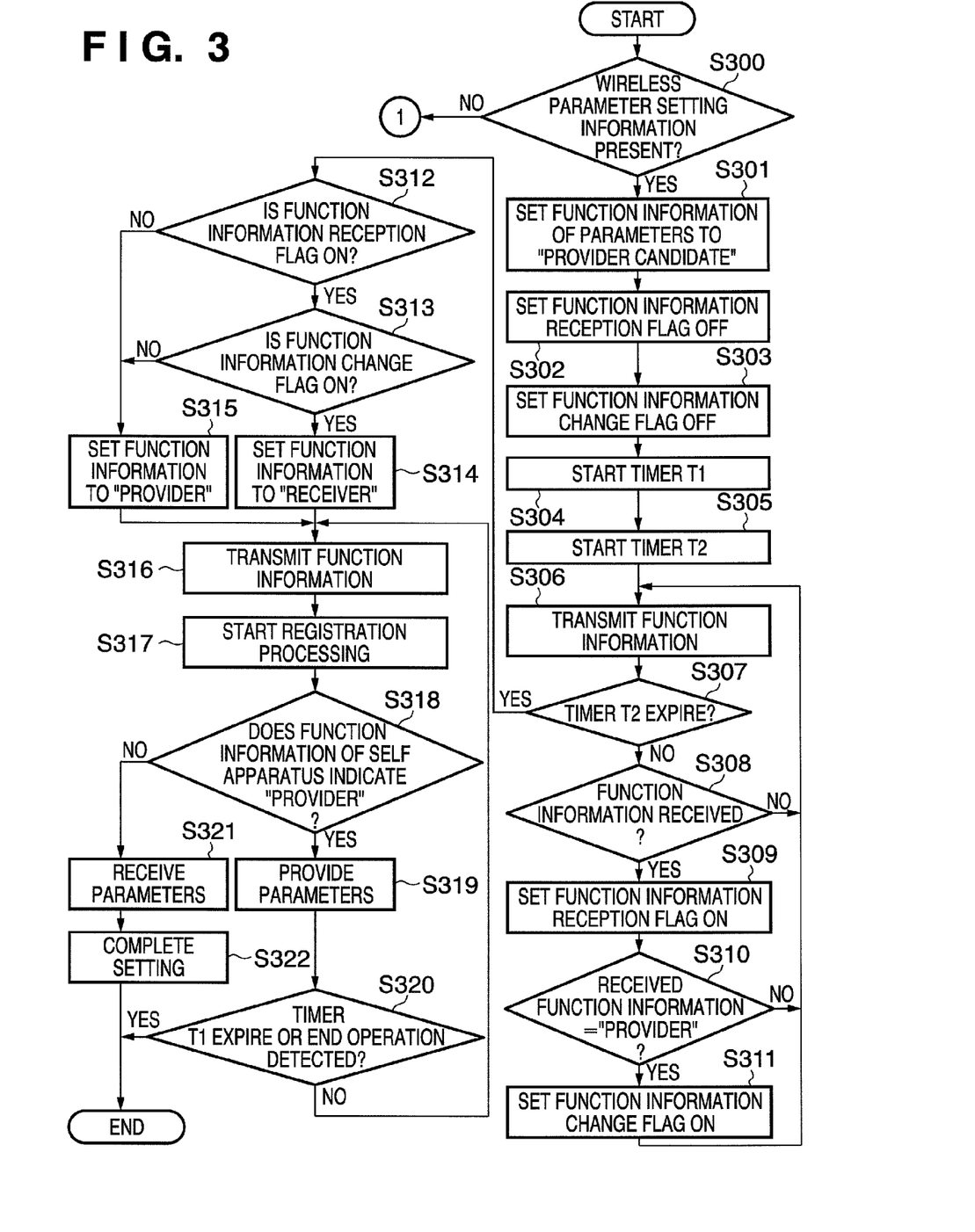
FIG. 3 is a flowchart showing the operation of a terminal in the embodiment.
Figure 4:
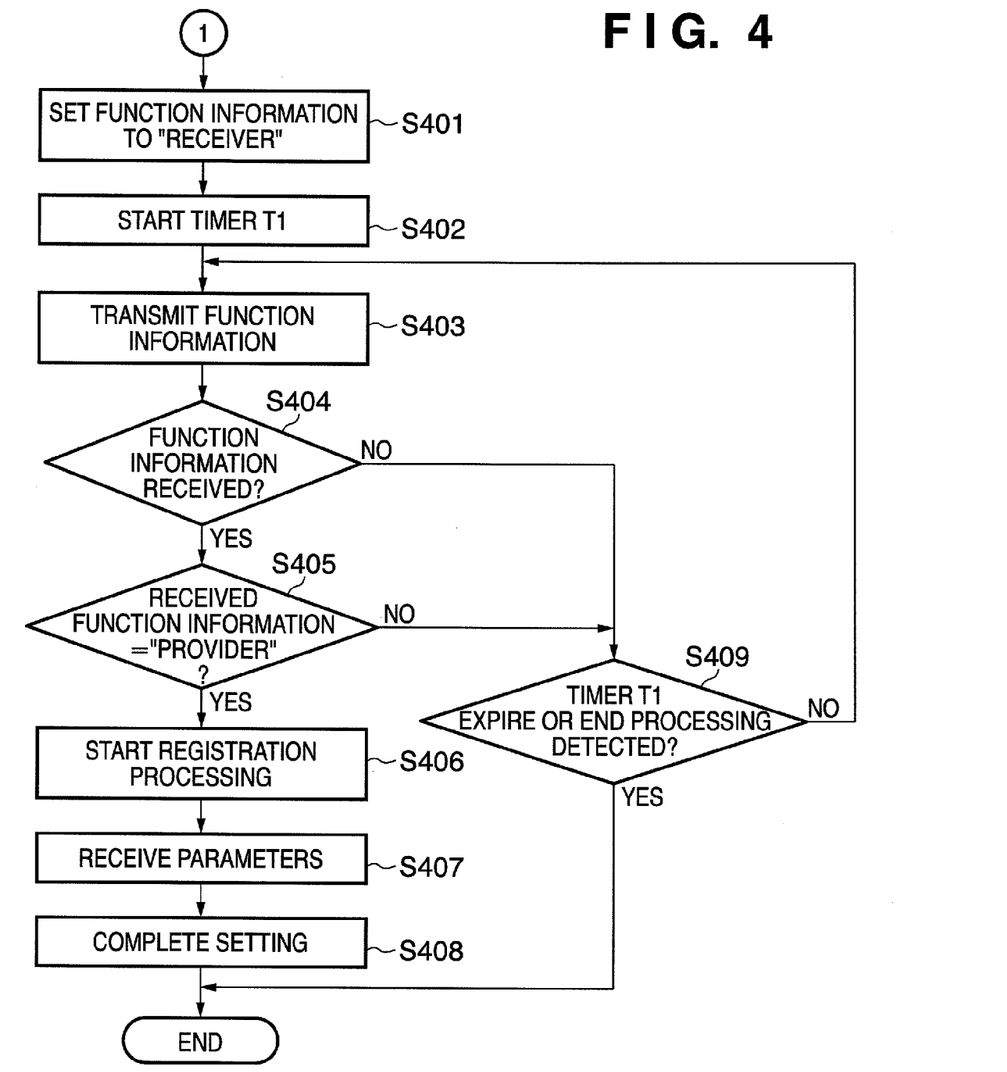
FIG. 4 is a flowchart showing the operation of a terminal in the embodiment.

FIGS. 3 and 4 are flowcharts showing the operation of the wireless parameter setting processing in the terminal A, terminal B, and terminal C in this embodiment. The operation shown in FIGS. 3 and 4 is implemented when the automatic setting execution unit 13a of the CPU 13 in each of the terminal A, terminal B, and terminal C respectively executes the programs stored in the ROM 12.

The wireless parameter setting processing is initiated by an operation such as an operation of pressing a button on an operation unit (not shown) of the terminal. Once the wireless parameter setting processing starts, the automatic setting execution unit 13a determines whether wireless parameter setting information is stored in the wireless parameter setting unit 11a (S300). Since the terminal A does not store the wireless parameter setting information in the wireless parameter setting unit 11a, the process advances to step S401 in FIG. 4.

Since the terminal B stores the wireless parameter setting information 101b in the wireless parameter setting unit 11a, the process advances to step S301. Since the terminal C also stores the wireless parameter setting information 101c in the wireless parameter setting unit 11a, the process advances to step S301. The automatic setting execution unit 13a of the terminal which stores the wireless parameter setting information in the wireless parameter setting unit 11a sets, to "Provider Candidate", function information indicating whether the terminal can provide or receive parameters, and sets it in the function information setting unit 11b (S301).

The automatic setting execution unit 13a sets OFF the function information reception flag 11c indicating whether the terminal has received function information from another terminal (S302). Furthermore, the automatic setting execution unit 13a sets OFF the function information change flag 11d indicating whether the function information of its own terminal has changed (S303).

The automatic setting execution unit 13a starts the timer T1 in which a time-out value for the whole of the wireless parameter setting processing is set (S304). The automatic setting execution unit 13a waits for function information from another terminal in the wireless parameter setting processing, and starts the timer T2 in which a time-out value for initiating processing of determining a final function of its own terminal is set (S305).

The value of the timer T1 is much larger than that of the timer T2, and is predetermined. The value of the timer T2 may be a fixed time-out value which is predetermined in a system, or may be a time-out value which is determined as a random value smaller than the value of the timer T1 when starting the timer T2.

Processing in steps S306 to S311 is repeated until a timeout of the timer T2.

The automatic setting execution unit 13a broadcasts the function information (which is already set to "Provider Candidate" at this time) of its own terminal to another terminal in the same network (S306).

The automatic setting execution unit 13a determines whether the timer T2 has expired (S307). If the timer T2 has not expired, the automatic setting execution unit 13a determines whether the terminal has received function information from another terminal (S308). If the terminal has not received function information from any other terminal, the process returns to the function information transmission processing (S306). If the terminal receives function information, the automatic setting execution unit 13a sets the function information reception flag 11c ON (S309). Furthermore, the automatic setting execution unit 13a determines whether the received function information indicates "Provider" which means that the terminal is confirmed as a provider of parameters (S310). If the received function information indicates "Provider", the automatic setting execution unit 13a sets the function information change flag 11d ON (S311); otherwise, the process returns to the function information transmission processing (S306).

When the timer T2 expires (S307), the automatic setting execution unit 13a determines whether the function information reception flag 11c is ON (S312). If the function information reception flag 11c is OFF, it can be considered that no other terminal exists in the same network. The automatic setting execution unit 13a changes the function information of its own terminal to "Provider", and sets it in the function information setting unit 11b (S315). Alternatively, if the function information reception flag 11c is ON, the automatic setting execution unit 13a checks the function information change flag 11d (S313). If the function information reception flag 11c is ON, it means that another terminal exists in the same network.

If the function information change flag 11d is ON, a provider of wireless parameters already exists in the same network. The automatic setting execution unit 13a changes the function information of its own terminal to "Receiver", and sets it in the function information setting unit 11b (S314). If the function information change flag 11d is OFF, a provider of wireless parameters does no exist in the same network. The automatic setting execution unit 13a changes the function information of its own terminal to "Provider", and sets it in the function information setting unit 11b (S315). When steps S314 and S315 are complete, whether the role of the terminal is the providing side or receiving side of wireless parameters is determined.

In the subsequent steps, the providing side actually transmits wireless parameters to a receiver (receiving side), and executes registration processing of registering the wireless parameters with the receiver.

The automatic setting execution unit 13a transmits the function information of its own terminal to other terminals (S316), and starts the wireless parameter registration processing with the other terminals (S317). At this time, the automatic setting execution unit 13a checks the setting contents of the function information setting unit 11b to determine whether the function information of its own terminal indicates "Provider" or "Receiver" (S318). If the function information indicates "Provider", the terminal is the providing side of wireless parameters; otherwise, the terminal is the receiving side of wireless parameters.

If the function information of its own terminal indicates "Provider", the automatic setting execution unit 13a provides a terminal on the receiving side with wireless parameters which are set in the wireless parameter setting unit 11a, in accordance with a request from the terminal on the receiving side (S319). The automatic setting execution unit 13a terminates the setting processing when the timer T1 has expired or an end operation by the user is detected (S320). Upon terminating the setting processing, the CPU 13 performs wireless LAN communication using the wireless parameters set in the wireless parameter setting unit 11a. If neither the timer T1 has expired nor an end operation is detected, the automatic setting execution unit 13a repeats the wireless parameter registration processing with the remaining terminals.

On the other hand, if the function information of its own terminal indicates "Receiver" (NO in step S318), the automatic setting execution unit 13a requests wireless parameters to another terminal whose function information indicates "Provider", and executes reception processing of the wireless parameters (S321). The automatic setting execution unit 13a sets the received wireless parameters in the wireless parameter setting unit 11a, and terminates the setting processing (S322). Upon terminating the setting processing, the CPU 13 performs wireless LAN communication using the wireless parameters set in the wireless parameter setting unit 11a. The wireless parameters are requested by transmitting a registration start request (to be described later).

Processing in FIG. 4 will be explained next. As described above, FIG. 4 shows the processing executed by a terminal whose wireless parameter setting unit 11a does not store the wireless parameter setting information.

The automatic setting execution unit 13a sets, to "Receiver", the function information indicating whether its own terminal can provide or receive parameters, and sets it in the function information setting unit 11b (S401). This is because a terminal whose wireless parameter setting unit 11a does not store wireless parameters starts the wireless parameter setting processing to require another terminal to provide wireless parameters.

The automatic setting execution unit 13a then starts the timer T1 in which the time-out value for the whole of the wireless parameter setting processing is set (S402). The automatic setting execution unit 13a broadcasts the function information (which is already set to "Receiver" at this time) of its own terminal to another terminal or terminals in the same network (S403). The automatic setting execution unit 13a determines whether its own terminal receives function information from another terminal (S404). If the terminal does not receive the function information from any other terminal, the automatic setting execution unit 13a determines whether the timer T1 has expired or whether the user executes an end operation (S409). If the timer T1 has expired or an end operation by the user is detected (S409), the automatic setting execution unit 13a terminates the setting processing. If neither the timer T1 has expired nor an end operation is detected, the automatic setting execution unit 13a repeats the transmission of the function information (S403).

If function information is received, the automatic setting execution unit 13a determines whether the received function information indicates "Provider" which means the terminal is determined as a provider of parameters (S405). If the received function information does not indicate "Provider", the automatic setting execution unit 13a executes the above processing in step S409. If the received function information indicates "Provider", the automatic setting execution unit 13a starts wireless parameter registration processing with the terminal which has transmitted the function information indicating "Provider" (S406). Once the registration processing starts, the automatic setting execution unit 13a requests wireless parameters to the terminal which has transmitted the function information indicating "Provider". The automatic setting execution unit 13a receives the wireless parameters transmitted by the terminal which has received the request (S407), sets the received wireless parameters in the wireless parameter setting unit 11a, and terminates the setting processing (S408). Upon terminating the setting processing, the CPU 13 performs wireless LAN communication using the wireless parameters set in the wireless parameter setting unit 11a.

When each terminal executes the above processing, a terminal which provides wireless parameters and a terminal which receives them are determined, and automatic setting of the wireless parameters from the terminal on the providing side to that on the receiving side is performed. After setting the wireless parameters, it is possible to execute wireless LAN communication using the set wireless parameters.

Figure 5:
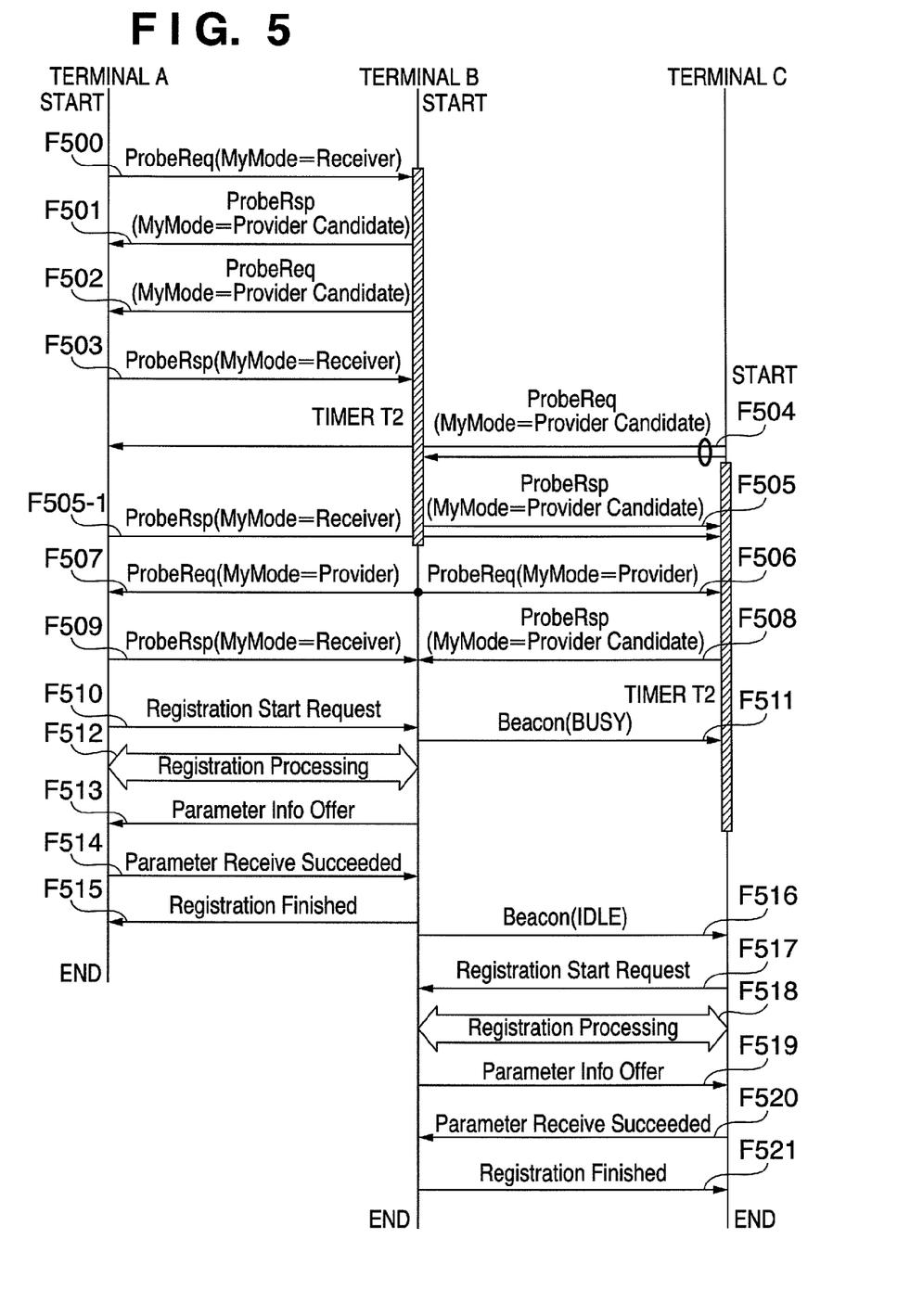
FIG. 5 is a sequence diagram showing the operations of a terminal A, terminal B, and terminal C in the embodiment.

FIG. 5 is a sequence diagram showing a case in which the terminal A, terminal B, and terminal C operate in a wireless LAN ad hoc mode and the terminals exist on the same network. An example in FIG. 5 shows the operations of the terminals in the following situation. The terminal C starts the wireless parameter setting processing after the terminal A and terminal B initiate the setting processing at almost the same time, and a time-out of the timer T2 of the terminal B occurs earlier than that of the timer T2 of the terminal C.

In FIG. 5, the terminal A sets its function information to "Receiver" (which is shown as MyMode=Receiver in FIG. 5, and will be referred to as R hereinafter). At the start of the processing, the terminal B and terminal C set their function information to "Provider Candidate" (which is shown as MyMode=Provider Candidate in FIG. 5, and will be referred to as PC).

The operations of the terminals will be explained bellow in accordance with the sequence diagram of FIG. 5.

First, the terminal A and terminal B initiate the wireless parameter setting processing at almost the same time. The terminal B starts the timer T2.

The terminal A broadcasts ProbeReq (to be referred to as a probe request R hereinafter) in which its function information is set to R (F500). The terminal B, which has received the probe request R from the terminal A, returns ProbeRsp (to be referred to as a probe response PC hereinafter) in which its function information is set to PC (F501).

In contrast to this, the terminal B broadcasts ProbeReq (to be referred to as a probe request PC hereinafter) in which its function information is set to PC (F502). The terminal A, which has received the probe request PC from the terminal B, returns ProbeRsp (to be referred to as a probe response R hereinafter) in which its function information is set to R (F503).

Next, the terminal C newly participates in the network. The terminal C broadcasts a probe request PC in which its function information is set to PC (F504). The terminal B returns a probe response PC as a response to the request (F505). The terminal A returns a probe response R (F505-1).

At this point, since a time-out of the timer T2 does not occur in either the terminal B or terminal C, the function information is not determined.

The terminal B does not receive the function information indicating "Provider" before the timer T2 expires. When the timer T2 expires, the terminal B, therefore, changes its function information to "Provider" (which is shown as MyMode=Provider in FIG. 5, and will be referred to as P hereinafter). The terminal B broadcasts ProbeReq (to be referred to as a probe request P hereinafter) in which its function information is set to P (F506 and F507).

The terminal A returns a probe response R in response to the probe request P from the terminal B (F509). Since the timer T2 of the terminal C has not expired, the terminal C returns a probe response PC in response to the probe request P from the terminal B (F508).

Since the terminal A receives the probe request P in which the function information is set to "Provider", the terminal A starts the registration processing with the terminal B which has transmitted the probe request P. The terminal A, which has started the registration processing, transmits Registration Start Request (to be referred to as a registration start request hereinafter) indicating a start request of the wireless parameter setting processing to the terminal B (F510). The terminal B which has received the request advances the registration processing with the terminal A (F512). In this processing, security authentication, key exchange, and the like are executed between the terminals.

When the processing in F512 succeeds, the terminal B transmits wireless parameters by using Parameter Info Offer to the terminal A, thereby providing the wireless parameters (F513).

Upon receiving the wireless parameters, the terminal A transmits Parameter Receive Succeeded indicating the success of the reception to the terminal B (F514). Upon receiving Parameter Receive Succeeded, the terminal B transmits Registration Finished indicating the end of the registration processing to the terminal A (F515).

With the above processing, the terminal A is provided with wireless parameters by the terminal B, and sets them to perform wireless LAN communication. When the registration processing with the terminal A starts, the terminal B transmits, on the network, Beacon (to be referred to as a beacon) which contains information indicating "BUSY" in order to suppress the registration processing from another terminal. A terminal which has received the beacon suppresses the start of the registration processing (F511).

When the registration processing with the terminal A is complete, the terminal B transmits a beacon which contains information indicating "IDLE" on the network (F516). A terminal, which has detected the beacon, starts the registration processing which has been suppressed (F517). However, if the timer T2 is started, the registration processing starts after a time-out of the timer T2.

The terminal C receives the function information indicating "Provider" from the terminal B before the timer T2 expires. When the timer T2 expires, the terminal C, therefore, sets its function information to "Receiver".

Upon receiving the beacon which contains the information indicating "IDLE", the terminal C requests the terminal B to start the wireless parameter registration processing by transmitting a registration start request to the terminal B (F517). The following registration processing (F518, F519, F520, and F521) between the terminal B and terminal C is the same as the above-mentioned processing between the terminal A and terminal B, and a description thereof will be omitted. In the above description, a beacon is used for notifying other terminals of the state of its own terminal in order to suppress the setting processing. However, it is possible to obtain the same effects by containing information indicating a setting processing execution state, information indicating a busy state, and the like in a probe request or probe response.

Figure 6:
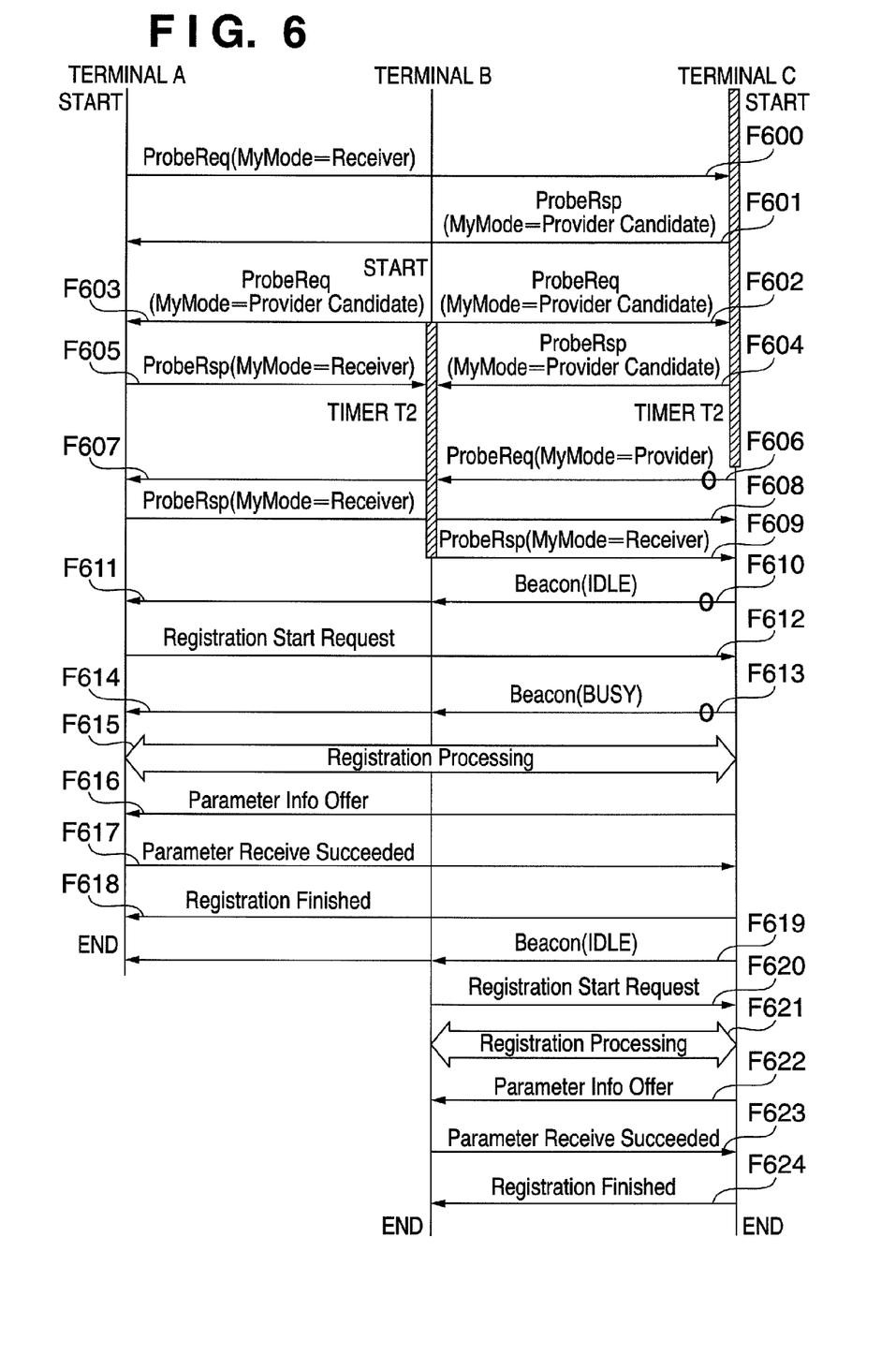
FIG. 6 is a sequence diagram showing the operations of the terminal A, terminal B, and terminal C in the embodiment.

FIG. 6 is a sequence diagram showing a case in which the terminal A, terminal B, and terminal C operate in a wireless LAN ad hoc mode and the terminals exist on the same network. An example in FIG. 6 shows the operations of the terminals in the following situation. The terminal B starts the wireless parameter setting processing after the terminal A and terminal C initiate the setting processing at almost the same time, and a time-out of the timer T2 of the terminal C occurs earlier than that of the timer T2 of the terminal B.

In FIG. 6, the terminal A sets its function information to "Receiver" (which is shown as MyMode=Receiver in FIG. 6, and will be referred to as R hereinafter). At the start of the processing, the terminal B and terminal C set their function information to "Provider Candidate" (which is shown as MyMode=Provider Candidate, and will be referred to as PC hereinafter).

The basic part of FIG. 6 is the same as that of the sequence in FIG. 5. The operations of the terminals will be explained below in terms of a characteristic part of FIG. 6 in accordance with the sequence diagram.

First, the terminal A and terminal C initiate the wireless parameter setting processing at almost the same time. The terminal C starts the timer T2. The terminal A broadcasts a probe request R in which its function information is set to R (F600).

Upon receiving the probe request R from the terminal A, the terminal C returns a probe response PC in which its function information is set to PC (F601).

Assume that the terminal B starts the setting processing next. When the terminal B starts the setting processing, the terminal B broadcasts a probe request PC in which its function information is set to PC (F602 and F603). In response to this probe request PC, the terminal C returns a probe response PC (F604), and the terminal A returns a probe response R (F605).

Assume that the timer T2 of the terminal C expires thereafter. The terminal C does not receive function information indicating "Provider" before the timer T2 expires. The terminal C, therefore, changes its function information to "Provider" (which is shown as MyMode=Provider, and will be referred to as P hereinafter) when the timer T2 expires. The terminal C broadcasts a probe request P (F606 and F607).

Upon receiving the probe request P from the terminal C, the terminal A returns a probe response R (F608).

Assume that the timer T2 expires before the terminal B responds to the probe request P from the terminal C. Since the terminal B has received the probe request P from the terminal C, the terminal B changes its function information to "Receiver", and returns a probe response R in response to the probe request P from the terminal C (F609).

The terminal C transmits a beacon which contains information indicating "IDLE" on the network (F610 and F611).

After it is confirmed that the beacon from the terminal C indicates "IDLE", the terminal A transmits a registration start request indicating a start request of the registration processing to the terminal C whose function information indicates "Provider" (F612). Upon receiving the registration start request, the terminal C transmits a beacon which contains information indicating "BUSY" on the network (F613 and F614).

The terminal C which has received the registration start request from the terminal A advances the registration processing with the terminal A (F615), and provides the terminal A with the wireless parameter setting information (F616, F617, and F618).

On the other hand, the terminal B which has received the beacon indicating "BUSY" suppresses the registration processing.

When the registration processing with the terminal A is complete, the terminal C changes the beacon to indicate "IDLE", and transmits it (F619). Upon receiving the beacon indicating "IDLE", the terminal B releases the suppression of the registration processing, and starts the registration processing with the terminal C (F620 to F624).

Figure 7:
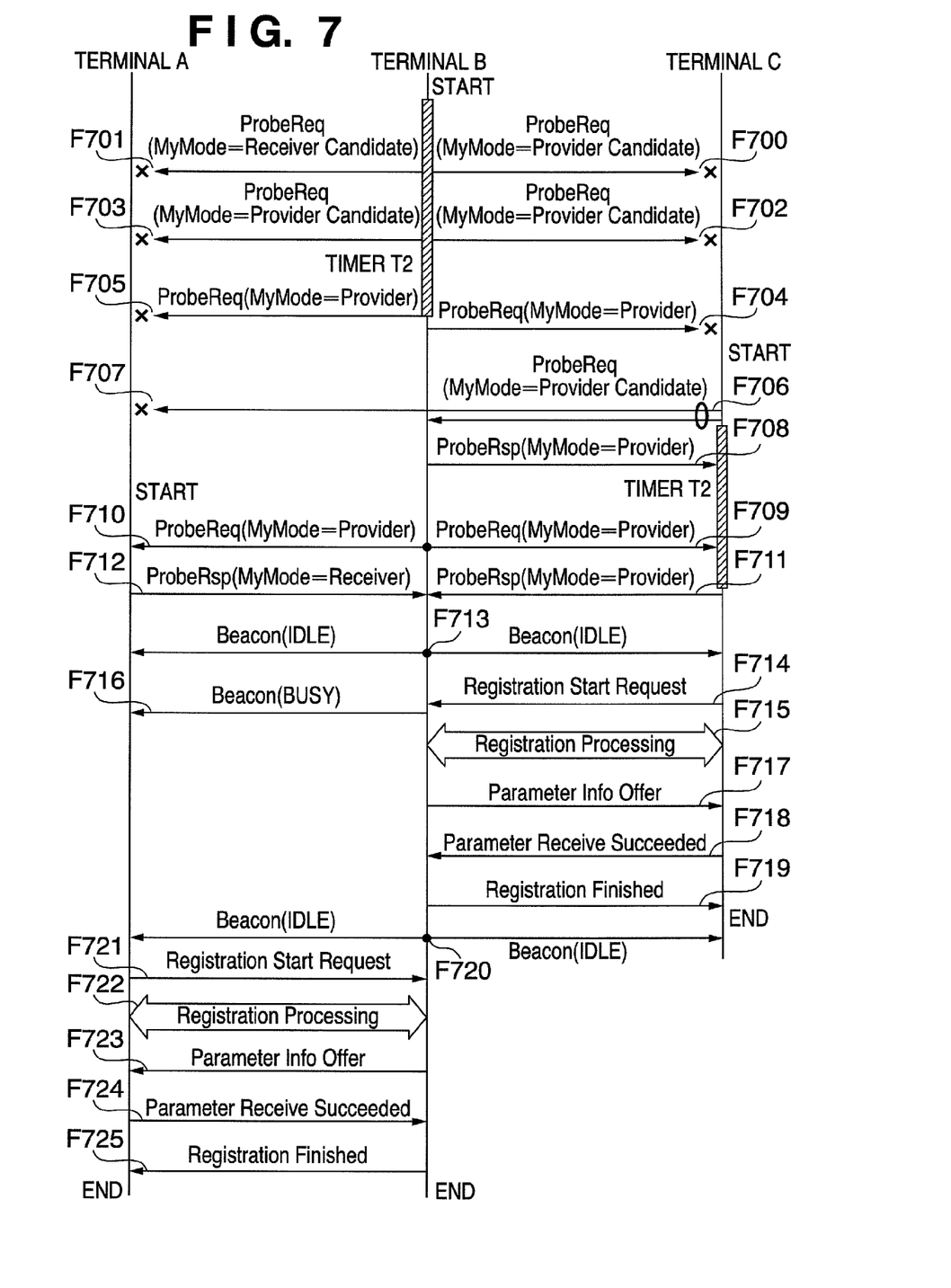
FIG. 7 is a sequence diagram showing the operations of the terminal A, terminal B, and terminal C in the embodiment.

FIG. 7 is a sequence diagram in which the terminal A, terminal B, and terminal C operate in a wireless LAN ad hoc mode, only the terminal B forms a network at first, and the terminal A and terminal C participate in the same network when the timer T2 of the terminal B expires.

The basic part of FIG. 7 is the same as that of the sequence in FIG. 5 or 6. The operations of the terminals will be explained below in terms of a characteristic part of FIG. 7 in accordance with the sequence diagram.

The terminal B initiates the wireless parameter setting processing, and starts the timer T2.

The terminal B broadcasts a probe request PC in which its function information is set to PC (F700 to F703). FIG. 7 shows a state in which there is no response since other terminals do not participate in the network at this time.

When a time-out of the timer T2 occurs, the terminal B broadcasts a probe request P in which its function information is set to "Provider". At this point, other terminals do not participate (F704 and F705).

Next, the terminal C participates in the network. When the terminal C broadcasts a probe request PC (F706 and F707), the terminal C receives a probe response P transmitted as a response by the terminal B (F708).

The terminal A also participates in the network next. The terminal A returns a probe response R in response to the probe request P (F710) from the terminal B (F712). When the timer T2 expires, the terminal C changes its function information to "Receiver" since the terminal C has received function information indicating "Provider" from the terminal B. The terminal C returns a probe response R in response to the probe request P from the terminal B (F709 and F711).

After that, the terminal B and terminal C execute the registration processing (F713 to F719). The terminal B and terminal A also perform the registration processing (F720 to F725).

As described above, a terminal which can provide communication parameters starts its operation after setting its function information to "Provider Candidate". The terminal whose function information indicates "Provider Candidate" finally sets the function information to "Provider" or "Receiver", and serves as a provider or receiver of the communication parameters. A terminal which cannot provide the communication parameters sets its function information to "Receiver", and starts the operation. When the terminal discovers a terminal whose function information indicates "Provider", the terminal receives communication parameters from that terminal. In this manner, even if the roles of a provider and receiver of communication parameters are not predetermined, it is possible to easily uniquely determine the transfer direction of communication parameters. Furthermore, even if there are a plurality of terminals which can provide communication parameters, it is possible to decide only one terminal as a provider of communication parameters among them. In this way, it is possible to set communication parameters without requiring a user to perform any cumbersome operation such as selection of a provider and receiver of the communication parameters.

Even if the roles of a provider and receiver of communication parameters are not predetermined, it is possible to execute the communication parameter setting processing.

A preferred embodiment of the present invention has been described above. However, this is merely an example for explaining the present invention, and various modifications can be made to the embodiment without departing from the spirit and scope of the present invention.

In the above description, a wireless LAN complying with the IEEE802.11 standard is described as an example. However, the present invention may be implemented in another wireless medium such as a wireless USB, MBOA (Multi Band OFDM Alliance), Bluetooth®, UWB (WUSB, W1394, WINET), and ZigBee. Furthermore, the present invention may be implemented in a wired communication medium such as a wired LAN.

Although a network identifier, encryption scheme, encryption key, authentication scheme, and authentication key are used as examples of communication parameters, another information may be used and also included in communication parameters.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. This application claims the benefit of Japanese Patent Application No. 2006-292710, filed Oct. 27, 2006, which is hereby incorporated by reference herein in its entirety.

The invention claimed is:

1. A communication apparatus having a function of operating as a providing apparatus, which provides communication parameters, and a function of operating as a receiving apparatus, which receives communication parameters, the apparatus comprising:
 a discrimination unit configured to discriminate a function of the communication apparatus with respect to a communication parameters setting procedure;
 an execution unit configured to execute the communication parameters setting procedure by exchanging predetermined messages between the communication apparatus and another communication apparatus according to a result of the discrimination; and
 a transmission unit configured to transmit information for restricting an attempt to connect to the communication apparatus from any other apparatuses except for said another communication apparatus while the execution unit executes the communication parameters setting procedure between the communication apparatus and said another communication apparatus until the communication parameters setting procedure ends,
 wherein a processing unit coupled to a memory unit is configured to implement at least one of the discrimination unit, the execution unit or the transmission unit.

2. The apparatus according to claim 1, further comprising a notification unit configured to notify said another communication apparatus of a function of the communication apparatus.

3. The apparatus according to claim 2, wherein, in a case where the function of the communication apparatus is not decided as the providing apparatus or the receiving apparatus, the notification unit notifies said another communication apparatus of information indicating that the function of the communication apparatus is not decided.

4. The apparatus according to claim 1,
 wherein, if the communication apparatus operates as the providing apparatus, the communication apparatus provides the communication parameters to said another communication apparatus, which operates as the receiving apparatus, by exchanging predetermined messages with said another communication apparatus.

5. The apparatus according to claim 1, wherein the communication parameters include one or more of: a network identifier, an encryption scheme, an encryption key, an authentication scheme, or an authentication key.

6. The apparatus according to claim 1, wherein the communication parameters are used for wireless communication compliant with IEEE 802.11 standard series.

7. The apparatus according to claim 1, further comprising an acquisition unit configured to acquire predetermined information from said another communication apparatus,
 wherein the discrimination unit discriminates the function of the communication apparatus based on the predetermined information acquired by the acquisition unit.

8. The apparatus according to claim 1, the transmission unit transmits the information to restrict a request for the communication parameter from any other apparatuses except for said another communication apparatus.

9. The apparatus according to claim 1, wherein the transmission unit transmits the information in a case where the communication apparatus operates as the providing apparatus, in the communication parameters setting procedure.

10. The apparatus according to claim 1, wherein the transmission unit continues to transmit the information until the communication parameters setting procedure succeeds.

11. The apparatus according to claim 1, wherein the transmission unit transmits a beacon including the information.

12. The apparatus according to claim 1, wherein the transmission unit transmits the information for restricting a request for the communication parameters from any other apparatuses except for said another communication apparatus while the execution unit executes the communication parameters setting procedure between the communication apparatus and said another communication apparatus.

13. A method of controlling a communication apparatus that includes a processing unit and that has a function of operating as a providing apparatus, which provides communication parameters, and a function of operating as a receiving apparatus, which receives the communication parameters, the method comprising steps of:
 discriminating a function of the another communication apparatus with respect to a communication parameters setting procedure; and
 executing the communication parameters setting procedure by exchanging predetermined messages between the communication apparatus and another communication apparatus according to a result of the discrimination, and
 transmitting information for restricting an attempt to connect to the communication apparatus from any other apparatuses except for said another communication apparatus while the execution unit executes the communication parameters setting procedure between the communication apparatus and said another communication apparatus until the communication parameters setting procedure ends,
 wherein at least one of the above steps is performed, at least in part, by the processing unit.

14. A non-transitory computer-readable storage medium storing a program for a computer-implemented method of controlling a communication apparatus that has a function of operating as a providing apparatus, which provides communication parameters, and a function of operating as a receiving apparatus, which receives the communication parameters, wherein the method includes steps of:
 discriminating a function of the communication apparatus with respect to a communication parameters setting procedure; and
 executing the communication parameters setting procedure by exchanging predetermined messages between the communication apparatus and another communication apparatus according to a result of the discrimination, and transmitting information for restricting an attempt to connect to the communication apparatus from any other apparatuses except for said another communication apparatus while the execution unit executes the communication parameters setting procedure between the communication apparatus and said another communication apparatus until the communication parameters setting procedure ends.

* * * * *